Feb. 10, 1959
A. F. SCHOTT
2,872,742
ABACUS WITH MAGNETIC MEANS FOR HOLDING
UNIT COUNTERS IN POSITION
Filed Dec. 10, 1954
2 Sheets-Sheet 1
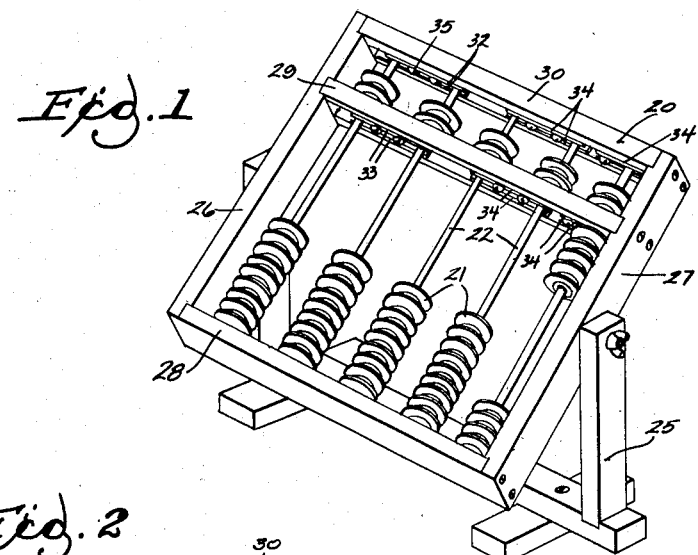
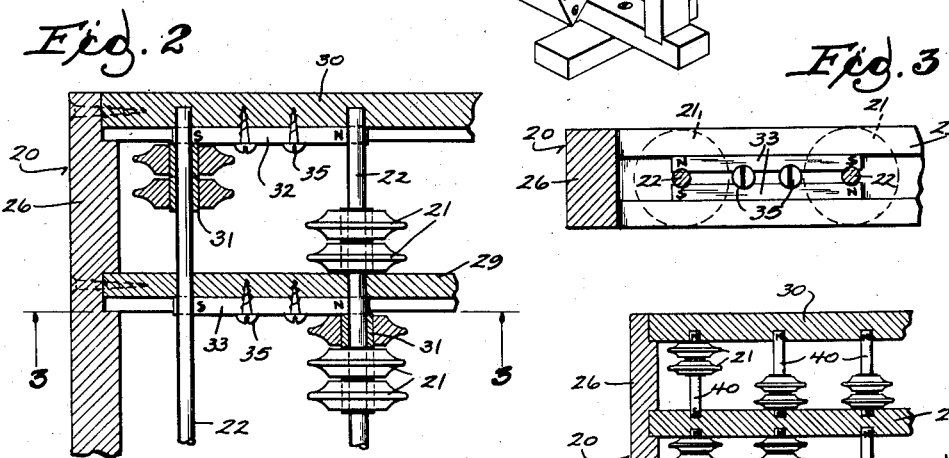
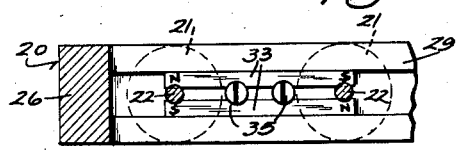
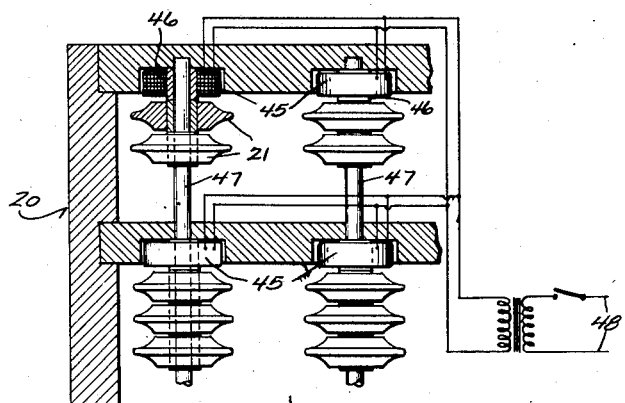
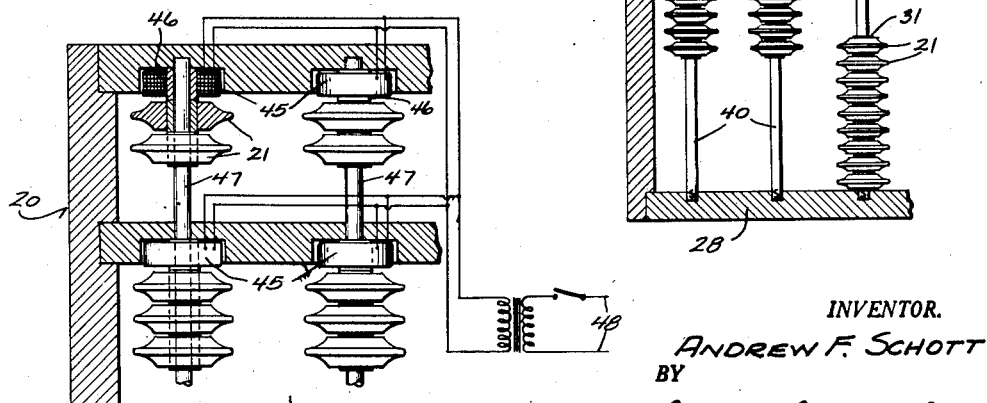
INVENTOR.
ANDREW F. SCHOTT
BY
Wheeler, Wheeler + Wheeler
ATTORNEYS Feb. 10, 1959 A. F. SCHOTT 2,872,742
ABACUS WITH MAGNETIC MEANS FOR HOLDING
UNIT COUNTERS IN POSITION
Filed Dec. 10, 1954 2 Sheets-Sheet 2
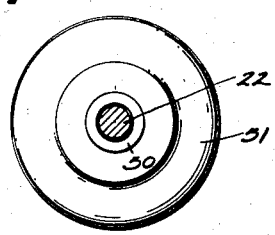
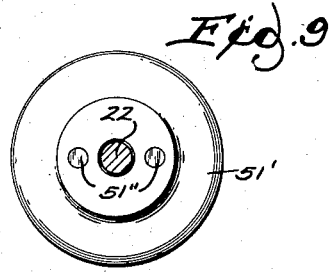
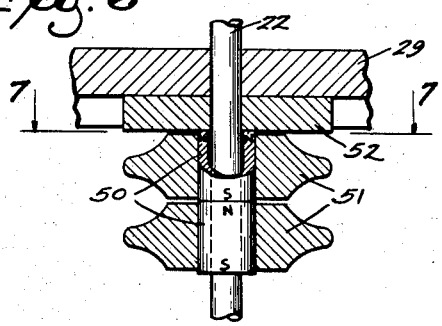
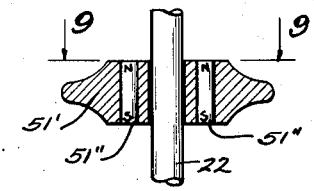
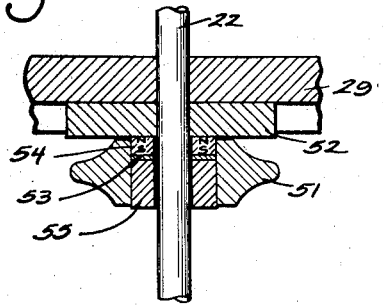
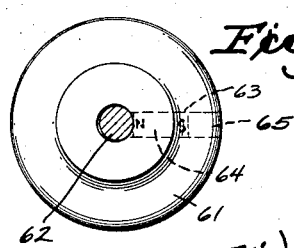
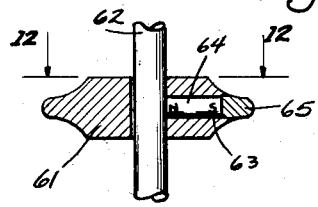
INVENTOR.
ANDREW F. SCHOTT
BY
Wheeler, Wheeler + Wheeler
ATTORNEYS United States Patent Office 2,872,742
Patented Feb. 10, 1959

2,872,742
ABACUS WITH MAGNETIC MEANS FOR HOLDING UNIT COUNTERS IN POSITION

Andrew F. Schott, Milwaukee, Wis.

Application December 10, 1954, Serial No. 474,357

7 Claims. (Cl. 35—33)

My invention relates to improvements in an abacus.

The abacus as used in the classroom or as an assistance in the classroom in the calculation incident to a mathematical problem is useful in its simplified form mechanically comprising a frame to hold spaced rods upon which unit counters may slide freely from one position to another, but if the abacus is to be used for demonstration purposes or the abacus is likely to be jostled during the active use thereof, the unit counters may be accidentally displaced with a resulting miscalculation or necessity for recalculating the entire problem. This invention is concerned with the provision of an improved abacus wherein the unit counters will remain in the position in which the user places them despite considerable shock or jolt that would cause a great deal of annoyance in previously known abaci.

Broadly speaking, the invention relates to the provision of magnetic means for insuring that the counting units of an abacus will remain where the user places them. More specifically, the invention relates to specially located and related magnetic means for accomplishing the broad purposes of the invention.

In the drawings:

Fig. 1 is a perspective of an easel mounted abacus made in accord with this invention.

Fig. 2 is an enlarged fragmentary view in vertical section through one corner of the abacus shown in Fig. 1, certain of the counting units being shown in section and others being shown in elevation to expose permanent magnets used in carrying out the invention.

Fig. 3 is a section on line 3—3 of Fig. 2.

Fig. 4 is a vertical section through an abacus embodying one form of the invention using permanent magnets and in which the permanent magnets comprise the rods upon which the counting units are slidably mounted.

Fig. 5 is a view similar to Fig. 2 but disclosing an alternative form of the invention in which electromagnets provide the required magnetic flux, the circuits for the electromagnets being shown diagrammatically.

Fig. 6 is an enlarged fragmentary detail showing an alternative form of permanent magnet comprising a portion of each of the unit counters, the frame being provided with a magnetically responsive member and the rod for guidance of the unit counters being magnetically non responsive.

Fig. 7 is a section on line 7—7 of Fig. 6.

Fig. 8 is a fragmentary vertical section through a counting unit mounted upon a magnetically non responsive rod and disclosing an alternative form of magnetic device for use in accord with the invention.

Fig. 9 is a section on line 9—9 of Fig. 8.

Fig. 10 is a vertical section similar to Fig. 6 but showing an alternative mounting of a special magnetic member in a counting unit.

Fig. 11 is a view similar to Fig. 8 but showing a further alternative form of applying a magnetic member to a counting unit which, in this instance, is mounted upon a magnetically responsive rod.

Fig. 12 shows a section on line 12—12 of Fig. 11.

As usually used, an abacus comprising a frame such as the frame generally shown at 20 in Fig. 1 is layed upon a table or other supporting surface while the user manipulates the counting units 21 which are slidably mounted upon rods 22 in such use of an abacus.

The counting units have sufficient inertia to remain where the user places them if there is no accidental shock or jolt to overcome such inertia. However, if the frame 20 must be mounted in a position such as that shown in Fig. 1 or is to be moved from one position to another, then the accidental displacement of the units by gravity or by shock or jolt may accidentally move a unit 21 from a position which has been selected by the user as indicative of a particular computation. Such misplacement of units can be aggravating and serious.

The particular abacus shown in Fig. 1 is mounted upon an easel 25 and is a particularly large abacus which may be used for demonstration purposes. It is particularly useful where a teacher is illustrating an abacus calculation to a class of students. Obviously, the counting units 21 when moved to their upper positions as shown in the upper right-hand corner in Fig. 1 will not remain in that position unless special means are provided to hold them, and it has been found that magnetic means will not only hold the unit satisfactorily in a selected position, but the user may move these units quite readily by separating the units merely with sufficient force to overcome the magnetic flux as will be described below.

The frame 20 includes side bars 26 and 27 with properly spaced bottom bar 28, stop bar 29 and top bar 30. In the preferred form of abacus with which this invention has been used, there are nine counting units 21 mounted on each rod 22 between the bottom bar 28 and the stop bar 29; also two counting units on each rod 22 between the stop bar 29 and the top bar 30. Each of the counting units 21 is made of a fairly light weight material in any suitable configuration as, for instance, that shown in the drawings, the rods 22 being receivable somewhat loosely through a bore extending through each unit. As shown in each of the constructions disclosed in the drawings with the exception of Figs. 4, 11 and 12, the rods are made of non magnetically responsive material such as wood, plastic, copper, etc.

In the preferred form of the invention shown in Figs. 1, 2, and 3, each counting unit 21 is made of wood, plastic or other nonmagnetically responsive material, but a sleeve 31 is fitted snugly in an axial bore through the unit and is of sufficient axial dimension to extend slightly beyond the unit at each end thereof. This sleeve is made of ferrous material or any substance which is magnetically responsive to the permanent magnets 32, 33 or 34 which are permanently installed as part of the bar construction of the frame 20. For instance, as shown in Fig. 2 the permanent magnets are secured to the respective bars by means of screws 35, thus when a unit 21 or a group of such units is thrust against a permanent magnet associated with upper bar 30 as shown in Fig. 2, the sleeve 31 of each unit coming in contact with a permanent magnet or coming in contact with another sleeve, which is in contact with a permanent magnet, becomes responsive to the permanent magnet and the unit tends to remain in the position at which it is thus "drawn." It is preferable to use soft iron for the sleeve 31 since any more than a slight residual magnetism may be annoying when the units are separated from the permanent magnets. Indication has been made upon the drawings as to the polarity of the permanent magnets, and it has been found that this arrangement is effective for carrying out the invention.

An alternative form of the invention is shown in Fig. 4. The rods 40 are made in the form of permanent magnets, the units are made with magnetically responsive sleeves 31, the result being that the units are magnetically grouped and tend to magnetically remain in the position in which they are manually placed.

As shown in Fig. 5, another alternative form of the invention includes the provision of electromagnets 45, the cores 46 of which are positioned at the ends of non-magnetically responsive rods 47. In this form of the invention, the units 21 are identical with the units shown in Figs. 1, 2, and 3. The sleeves 31 respond to the magnetic flux in the same manner disclosed with reference to the permanent magnet construction. Suitable electric circuits and a source of electric current at 48 is used to energize the electromagnets as will be readily understood.

As shown in Fig. 6, the magnetic flux may be provided by sleeves 50 in units 51. The sleeves 50 are permanent magnets shaped substantially like the sleeves 31 in the unit 21. The rod 22 is non-responsive magnetically but a magnetically responsive bar or block 52 carried by a frame member will magnetically tend to hold the unit or units as will be readily understood. Some benefit has been found in the use of a copper washer 53 to divide a sleeve into two sections, one of which as shown in Fig. 10 comprises an annular magnet 54 and a sleeve 55 of soft iron. Here the separation of the units appears to be more readily made and the units tend to remain satisfactorily in the position in which they are placed.

Another manner in which the magnetic element may be incorporated in a unit is shown in Figs. 8 and 9 where unit 51' to move upon a non-responsive rod 22 is provided with spaced bores 51" to receive individual bar or rod-like magnets to be moved toward or away from the magnets of another unit 51' or toward or away from a soft iron bar such as the one at 52 shown in Fig. 6.

Another alternative form of the invention, but one which requires a magnetically responsive rod 62 is shown in Figs. 11 and 12. Here the unit 61 is provided with a radial bore 63 into which a rod shaped permanent magnet 64 is fitted tightly. A plug 65 may be inserted in the bore 63 to improve the appearance of the unit. The magnet 64 causes the unit to snugly, frictionally bear upon the rod 62, and the unit tends to remain in the position in which the user places it.

The above description illustrates the manner in which magnetic flux is used in accord with this invention to assist the user of an abacus in placing and holding counting units. When an individual unit is moved to a desired position against another unit or against a bar or frame member, the unit will remain in the selected position until the user forces it to separate from the magnetic influence which has held it. The result is that an abacus made in accord with this invention may be quite roughly handled and will not be responsive to anything but the most severe jolts or shocks.

I claim:

1. In an abacus having a counting unit and a spindle along which said unit is adjustable, said unit and said spindle having mutually magnetically attractive material whereby movement of the unit along the rod is reluctant.

2. An abacus having a frame supported rod, said rod including magnetically responsive material, and counting units mounted to be moved along the rod, at least one of said units being magnetically responsive to the material of the rod.

3. The abacus of claim 2 wherein the magnetically responsive unit is bored to receive the rod therethrough.

4. The abacus of claim 2 wherein the magnetically responsive unit has magnetically responsive material in the form of a sleeve longitudinally disposed in a bore through the unit.

5. The abacus of claim 2 wherein the magnetically responsive unit is provided with an elongated bore at an acute angle to the rod and has a permanent magnet in said bore.

6. In an abacus having a magnetically non-responsive rod, and a plurality of counting units mounted for slidable adjustment on the rod relative to each other, magnetically responsive material incorporated in each of said units, whereby the units are separably attracted to each other.

7. The abacus of claim 6 wherein the rods are mounted to a frame having cross bars, and at least one of said bars is provided with material responsive magnetically to the units on the rods.

References Cited in the file of this patent

UNITED STATES PATENTS

| | | |
|---|---|---|
| 532,282 | Myers | Jan. 8, 1895 |
| 861,541 | Rieck | July 30, 1907 |
| 1,605,703 | Brown | Nov. 2, 1926 |
| 2,643,466 | Bucher | June 30, 1953 |
| 2,646,631 | Lazar | July 28, 1953 |
| 2,654,164 | Seidenberg | Oct. 6, 1953 |